US010066770B2

(12) United States Patent
Matlack et al.

(10) Patent No.: US 10,066,770 B2
(45) Date of Patent: Sep. 4, 2018

(54) WELDLESS TRANSFER TUBE ASSEMBLY

(71) Applicant: Hamilton Sundstrand Corporation, Windsor Locks, CT (US)

(72) Inventors: Floyd K. Matlack, North Granby, CT (US); Christian Fages, Figeac (FR)

(73) Assignee: HAMILTON SUNDSTRAND CORPORATION, Windsor Locks, CT (US)

(*) Notice: Subject to any disclaimer, the term of this patent is extended or adjusted under 35 U.S.C. 154(b) by 346 days.

(21) Appl. No.: 14/838,943

(22) Filed: Aug. 28, 2015

(65) Prior Publication Data
US 2016/0076680 A1    Mar. 17, 2016

(30) Foreign Application Priority Data

Sep. 11, 2014   (EP) .................................. 14306397

(51) Int. Cl.
*F16L 21/08*      (2006.01)
*C23C 8/24*       (2006.01)
*F16L 39/00*      (2006.01)
*F16L 55/115*     (2006.01)

(52) U.S. Cl.
CPC .............. *F16L 21/08* (2013.01); *C23C 8/24* (2013.01); *F16L 39/005* (2013.01); *F16L 55/1157* (2013.01)

(58) Field of Classification Search
CPC ......... Y10T 29/49904; Y10T 29/49947; B23P 15/00; B23P 2700/00; F16L 21/08; F16L 39/005; F16L 55/1157
See application file for complete search history.

(56) References Cited

U.S. PATENT DOCUMENTS

| 2,788,992 | A | * | 4/1957 | De Vienne | F16L 19/065 285/136.1 |
| 3,498,647 | A | * | 3/1970 | Schroder | F16L 19/086 174/75 C |
| 3,765,456 | A | * | 10/1973 | Karpenko | F16L 21/08 138/89 |
| 4,422,675 | A | * | 12/1983 | Norris | F02C 7/222 285/123.1 |
| 4,688,831 | A | * | 8/1987 | Viehmann | E21B 17/18 285/124.4 |

(Continued)

FOREIGN PATENT DOCUMENTS

| CN | 2186123 Y | 12/1994 |
| CN | 102257304 A | 11/2011 |

(Continued)

OTHER PUBLICATIONS

Extended Search Report, dated Feb. 24, 2015, European Search Report No. 14306397.2-1758; pp. 6.

(Continued)

*Primary Examiner* — Jason L Vaughan
(74) *Attorney, Agent, or Firm* — Cantor Colburn LLP

(57) ABSTRACT

A weldless assembly comprises a plurality of tubes, wherein the plurality of tubes includes an inner tube, an intermediate tube, and an outer tube; a first closure end configured to cap a first side of the plurality of tubes; and a second closure end configured to cap a second side of the plurality of tubes.

6 Claims, 3 Drawing Sheets

(56) References Cited

U.S. PATENT DOCUMENTS

| | | | | |
|---|---|---|---|---|
| 4,732,414 | A | * 3/1988 | Inaba | F16L 39/005 |
| | | | | 285/123.15 |
| 4,913,268 | A | * 4/1990 | Parker | B60R 19/32 |
| | | | | 188/322.19 |
| 5,239,964 | A | 8/1993 | Diener et al. | |
| 5,246,087 | A | * 9/1993 | Schipper | F16L 27/087 |
| | | | | 184/5 |
| 5,722,702 | A | * 3/1998 | Washburn | F16L 21/08 |
| | | | | 285/322 |
| 5,975,587 | A | * 11/1999 | Wood | F16L 37/092 |
| | | | | 156/158 |
| 6,062,605 | A | * 5/2000 | Goshima | F16L 19/0206 |
| | | | | 277/603 |
| 9,163,767 | B2 | * 10/2015 | Norem | F16L 39/04 |
| 9,851,034 | B2 | * 12/2017 | Nicholson | F16L 13/146 |

FOREIGN PATENT DOCUMENTS

| | | | | |
|---|---|---|---|---|
| CN | 104023837 A | 9/2014 | | |
| EP | 2615345 A2 | * 7/2013 | | F16L 39/04 |
| FR | 1065308 A | 5/1954 | | |
| FR | 2969737 A1 | 6/2012 | | |

OTHER PUBLICATIONS

OA dated Apr. 2, 2018 in U310503CN, CN Application No. 201510576181.7, English Translation, 2 pages.

* cited by examiner

WELDLESS TRANSFER TUBE ASSEMBLY

DOMESTIC PRIORITY

This application is a U.S. Non Provisional Application of EP No. 14306397.2 filed on Sep. 11, 2014, the disclosure of which is incorporated by reference herein in its entirety.

BACKGROUND

The disclosure relates generally to transfer tube assemblies, and more specifically, to a weldless assembly that is constructed from both ends to enable increases in a final length of transfer tubes of the weldless assembly while realizing manufacturing gains.

In general, present welded transfer tube assemblies contain a flange and welds that present inherent problems with respect to manufacturing, proper sealing, tube finish imperfections, nitride depths, and tube length. Further, nitriding of the present welded transfer tube assemblies to achieve particular material properties is difficult for welded structures as a result of localized inconsistencies of the material properties resulting at the welds, therefore it would be desirable to have a transfer tube assembly that does not require welding.

BRIEF DESCRIPTION OF THE INVENTION

According to one embodiment of the present invention, a weldless assembly comprises a plurality of tubes, wherein the plurality of tubes includes an inner tube, an intermediate tube, and an outer tube; a first closure end configured to cap a first side of the plurality of tubes; and a second closure end configured to cap a second side of the plurality of tubes.

According to another embodiment of the present invention, a method of constructing a weldless assembly comprises inserting an inner tube into an intermediate tube, applying a first closure end onto the intermediate tube and the inner tube thereby constructing the first sub-assembly, inserting the first sub-assembly into an outer tube by forcing an end of the first sub-assembly opposite to the first closure end through the center of the outer tube, applying a second closure end onto the end of the first sub-assembly opposite to the first closure end, and applying a guide onto the second closure end thereby constructing the weldless assembly.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION OF THE INVENTION

A detailed description of one or more embodiments of the disclosed apparatus and method are presented herein by way of exemplification and not limitation with reference to the Figures.

As indicated above, present welded transfer tube assemblies contain welds that present inherent problems with respect to proper sealing, tube finish imperfections, nitride depths, and tube length. Thus, what is needed is a weldless transfer tube assembly that is constructed from both ends to enable increases in a final length of the assembly.

In general, embodiments of the present invention disclosed herein may include a weldless assembly that comprises a plurality of tubes, wherein the plurality of tubes includes an inner tube, an intermediate tube, and an outer tube; a first closure end configured to cap a first side of the plurality of tubes; and a second closure end configured to cap a second side of the plurality of tubes.

The weldless assembly is constructed and/or manufactured via gas nitride processes or nitriding that can accommodate long tubes (e.g., three feet) via large containment chambers and that can use less heat in the application. Nitriding is a heat treating process that diffuses nitrogen into the surface of a metal to create a case hardened surface. For the weldless assembly, each of the inner, the intermediate, and the outer tubes are separately nitrided to ensures consistent material properties (e.g., hardness properties) between the material (e.g., the steel) of the inner, intermediate, and outer tubes. That is, the separate tubes of the weldless assembly are nitrided before assembly so that the weldless assembly is treated with very little post assembly nitriding surface finishing; in contrast, nitriding before assembly is not possible with a welded tube. Thus, failures with respect to inconsistencies in the nitriding the elements of the weldless assembly are eliminated due to the weldless assembly enabling a more controlled gas nitride process on a per part basis.

For example, a gas nitride process provides a straight weldless outer tube without a flange for the weldless assembly, e.g., about an inch and a half in diameter, that is produced much more accurately for final finishing (while the intermediate tube and inner tubes are also made without welds). Each tube is then assembled, secured, and further finished. Moreover, the weldless outer tube produced via gas nitride requires that one side rotate in a journal bearing that seals high pressure oil thru a lap fit. This is a rotational interface supported by oil film thickness. The opposite end is non-rotating and sealed with elastomeric seals. The opposite end has a dynamic element that requires that it be treated with close finishes and smooth surfaces (e.g., requires final finishing). The weldless assembly may be employed in many different systems, such as, a propeller systems comprising multiple actuators contained therein.

Figure 1:
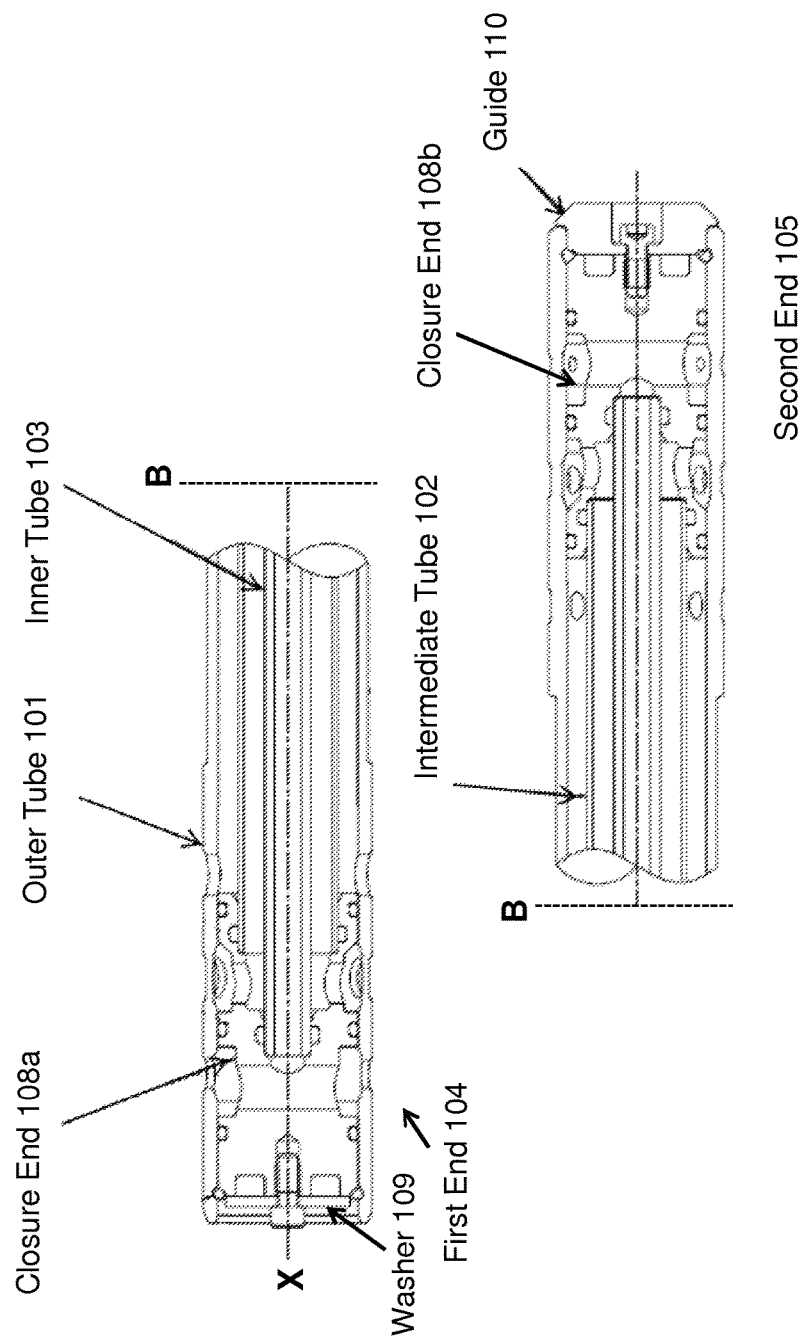
FIG. 1 illustrates an embodiment of a weldless assembly.

FIG. 1 illustrates an embodiment of a weldless assembly 100 that includes an outer tube 101, intermediated tube 102, and an inner tube 103 oriented along an axis X. The weldless assembly 100 has a continuous center portion that generally comprises of the lengths of the tubes 101, 102, 103. The continuous center portion has both sides open (e.g., a first end 104 and a second end 105). That is, the outer tube 101 is open on both ends so that hardware is installed on both ends and so that a very short distance of the outer tube will be finished (e.g., eliminating the need to finish the outer tube 101 all the way through). The intermediate tube 102 and the inner tube 103 are sealed with champers. The first end 104 and the second end 105 are respectively fitted with closure ends 108a, 108b, which are rig retainers that are held in place by a washer 109 and a guide 110. As illustrated in FIG. 1, line B represents a divide between the ends 104, 105 along the continuous center portion. This divide in no way limits a particular length of the weldless assembly 100.

In one embodiment, the weldless assembly 100 is constructed by the closure end 108a being applied to the intermediate tube 102 and the inner tube 103 (thereby creating the first end 104). For instance, after the inner tube 103 is inserted into the intermediate tube 102, the closure end 108a is applied and secured via the washer 109 with a fastener (e.g., a screw) onto the intermediate tube 102 and the inner tube 103, such that corresponding seals of the closure end 108a meet and match these tubes 102, 103. The. The combination of the closure end 108a, the inner tube 103, and the intermediate tube 102 forms a three piece assembly.

The three piece assembly is slid into the outer tube 101 by forcing an end of the three piece assembly opposite to the closure end 108a (e.g., the second end 105) through the center of the outer tube 101. The closure end 108b is then fitted onto the three piece assembly. For instance, the intermediate tube 102 and the inner tube 103 are together inserted through the outer tube 101 down the axis X and placed into position at the second end until the outer tube 101 aligns with a seal of the closure end 108b (e.g., such that champers catch the intermediate and inner tubes 102, 103 in place). A snap ring may be utilized to secure the closure end 108b to the outer tube 101 after alignment with the intermediate tube 102 and the inner tube 103. The closure end 108b next receives the guide 110. For instance, the four piece assembly is stood on its side (e.g., the first end 104) such that the second end 105 is facing vertically upwards. Then the guide 110 is forced into place on the second end 105 and secured with a fastener, e.g., a screw. The outer tube 101, the intermediate tube 102, the inner tube 103, the closure ends 108a, 108b, and the guide form the weldless assembly 100.

Figure 2A:
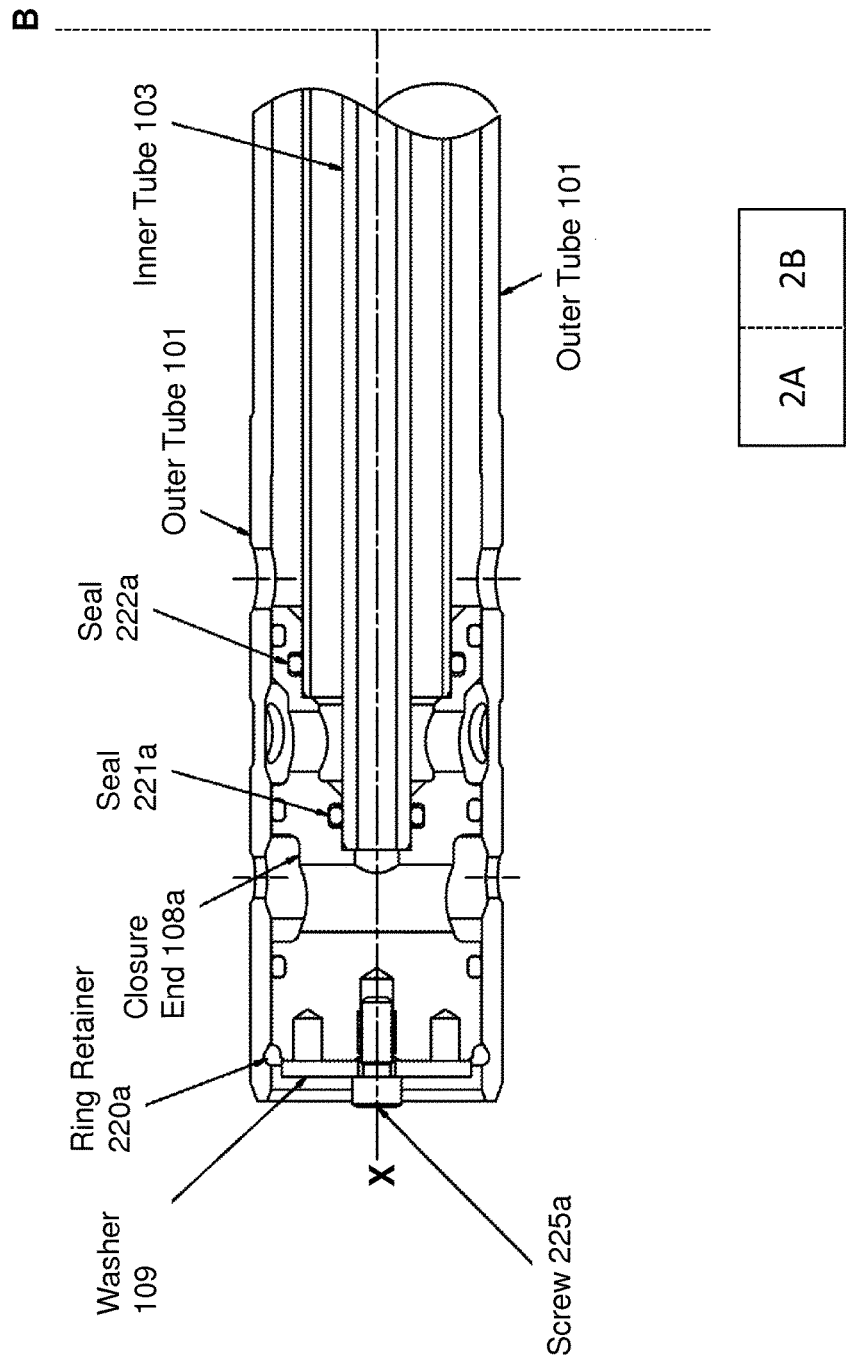
FIGS. 2A-B illustrate an embodiment of a weldless assembly.
Figure 2B:
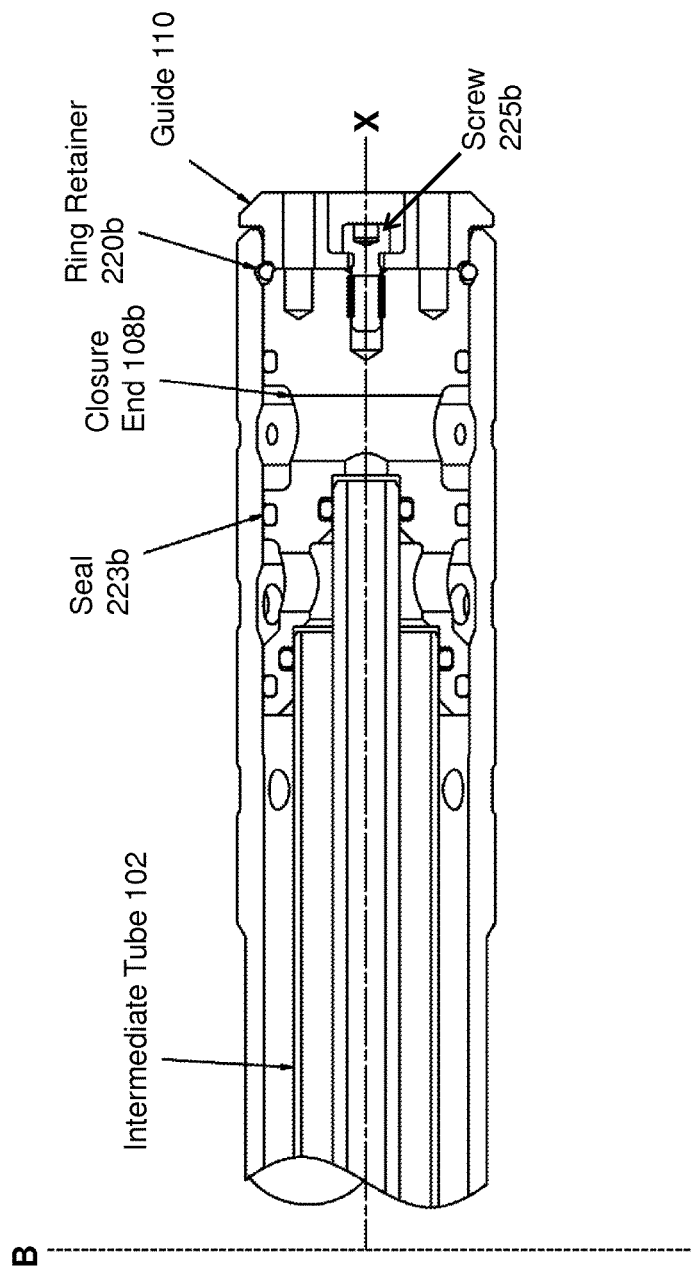

FIGS. 2A-B respectively illustrate magnified versions of the first end 104 and the second end 105 of the weldless assembly 100, where the line B represents the continuous connection between FIGS. 2A-B. As illustrated in FIG. 2A, the first end 104 may include a ring retainer 220a, seals 221a, 222a, and a screw 225a. As illustrated in FIG. 2A, the second end 105 may include seal 223b and a screw 225b.

The first end 104 and the second end 105 are generally mirrored. That is, the same closure end type may be used on both ends (e.g., the first and second end 104, 105), include the same number of seals (221a, 222a, 223b), and be fixed in place by a screw (225a, 225b). In turn, any closure end type may define the number and orientation of valves and seals, such as in a symmetrical pattern. Further, all of the seals are located on each closure end thereby allowing each tube to be a solidly formed member of the weldless assembly 100. A distinction in the above embodiment is the first end 104 and the second end 105 is that the first end 104 includes a washer, while the second end 105 includes a guide; however, this distinction is not limiting and both ends (104, 105) may include a guide and/or washer in any combination.

Aspects of the present invention are described herein with reference to flowchart illustrations, schematics, and/or block diagrams of methods, apparatus, and/or systems according to embodiments of the invention. Further, the descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of constructing a weldless assembly, comprising:
   inserting an inner tube into an intermediate tube;
   applying a first closure end onto the intermediate tube and the inner tube thereby constructing the first sub-assembly;
   inserting the first sub-assembly into an outer tube by forcing an end of the first sub-assembly opposite to the first closure end through the center of the outer tube;
   applying a second closure end onto the end of the first sub-assembly opposite to the first closure end; and
   applying a guide onto the second closure end thereby constructing the weldless assembly.

2. The method of claim 1, further comprising:
   separately nitriding each of the inner, the intermediate, and the outer tubes to ensure consistent material properties between the inner, the intermediate, and the outer tubes prior to inserting the inner tube into the intermediate tube and to inserting the first sub-assembly into the outer tube.

3. The method of claim 1, wherein the applying of the first closure end onto the intermediate tube and the inner tube further comprises:
   aligning a plurality of seals of the first closure end with the intermediate tube and the inner tube.

4. The method of claim 1, wherein the inserting of the first sub-assembly into the outer tube further comprises:
   aligning the intermediate tube and the inner tube during the inserting of the first sub-assembly based on chamfers of the outer tube catching the intermediate tube and the inner tube in place.

5. The method of claim 1, wherein the inserting of the first sub-assembly into the outer tube further comprises:
   utilizing a snap ring to secure the second closure end to the outer tube.

6. The method of claim 1, wherein the applying of the second closure end onto the end of the first sub-assembly opposite to the first closure end further comprises:
  securing the guide with a fastener to the second closure end.

* * * * *